2,636,774

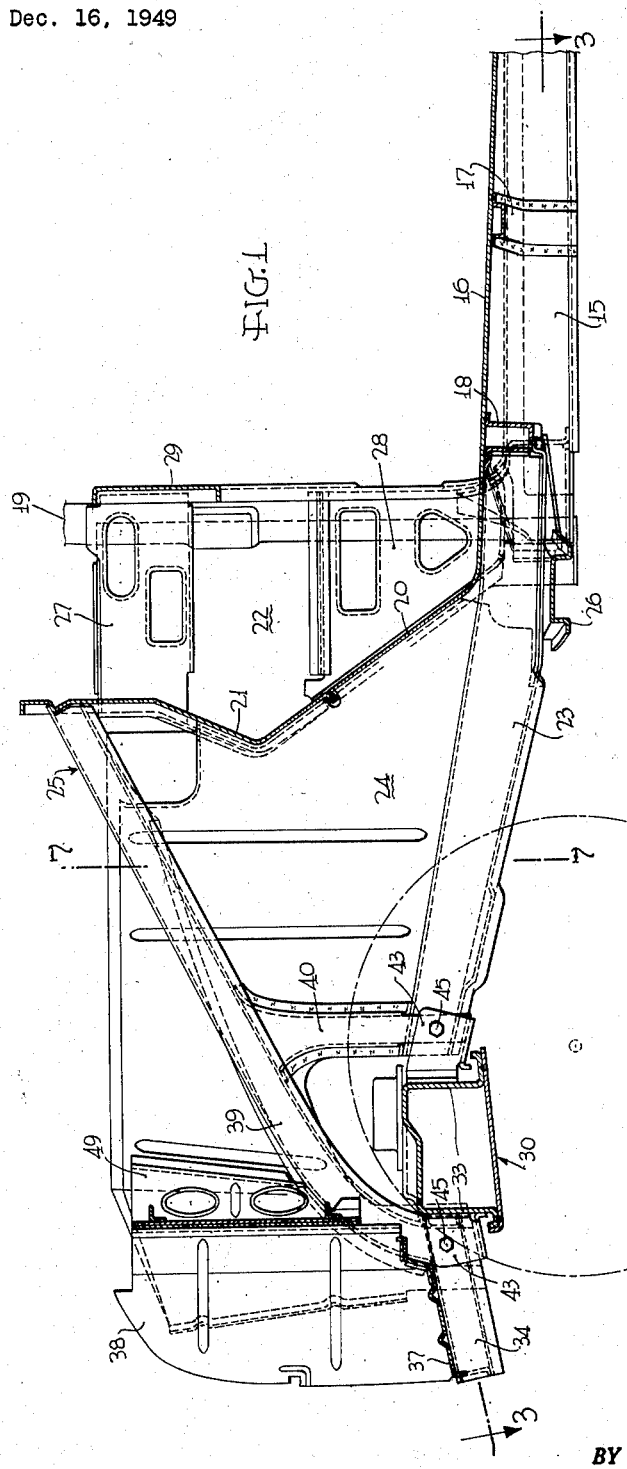

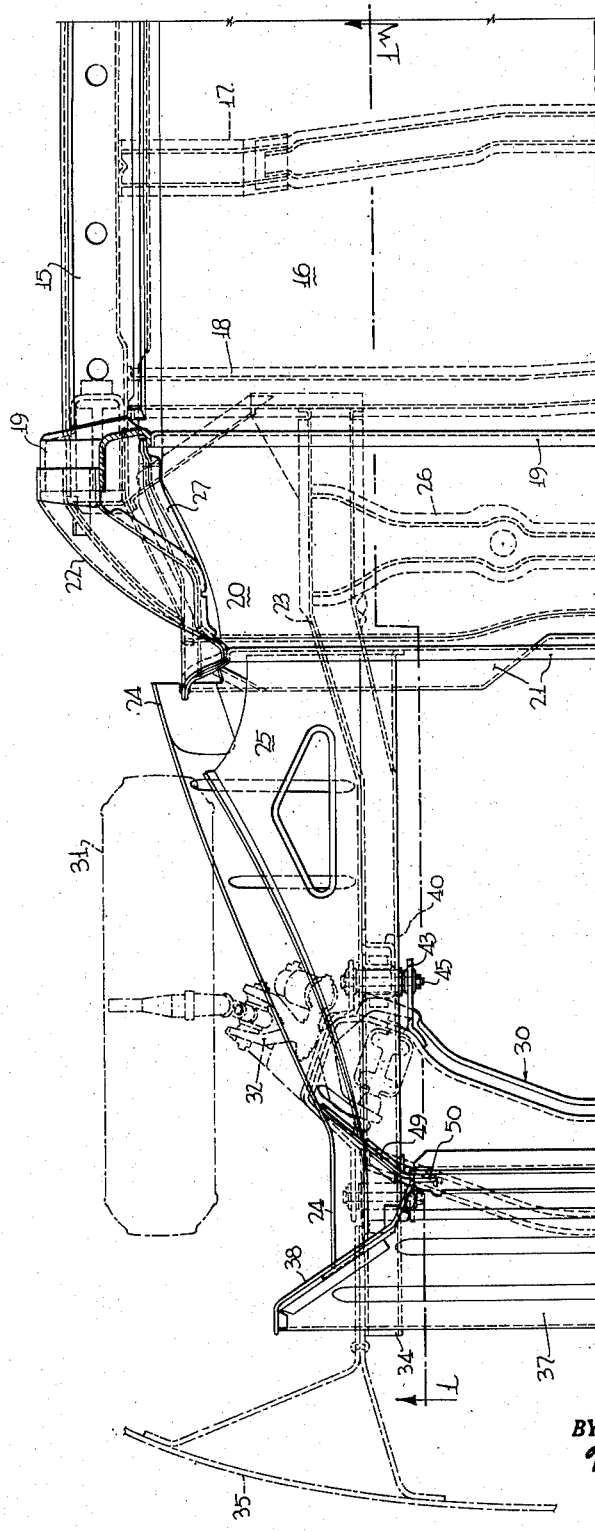

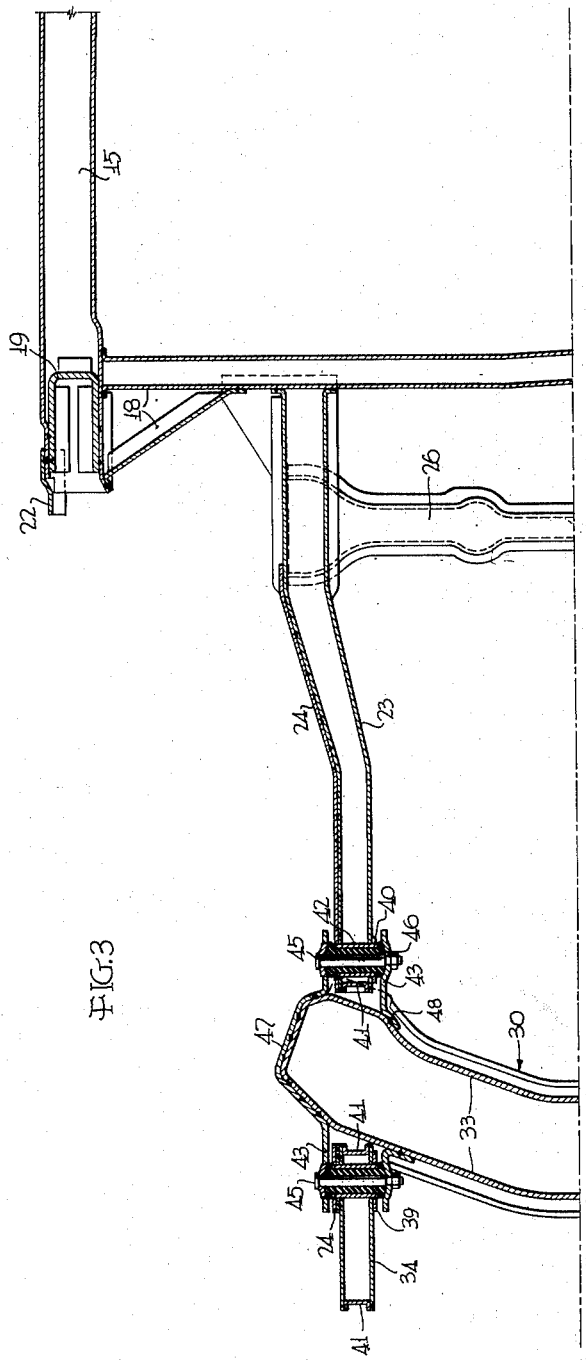
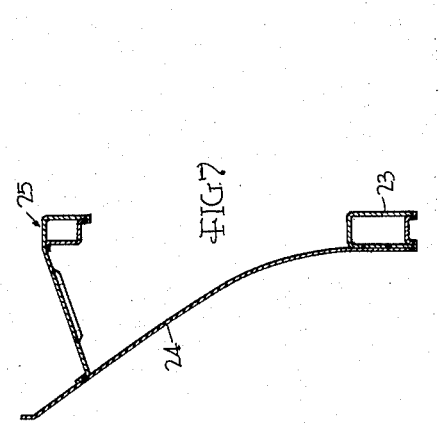
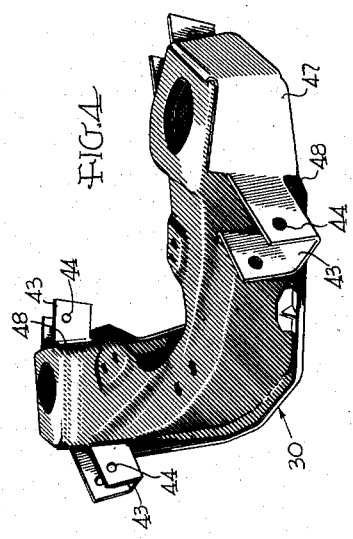
INVENTOR.
Alexander R. Lindsay
BY Maurice A. Crews
ATTORNEY April 28, 1953 A. R. LINDSAY 2,636,774
CROSSBEAM ATTACHMENT FOR AUTOMOBILES
Filed Dec. 16, 1949 4 Sheets-Sheet 4
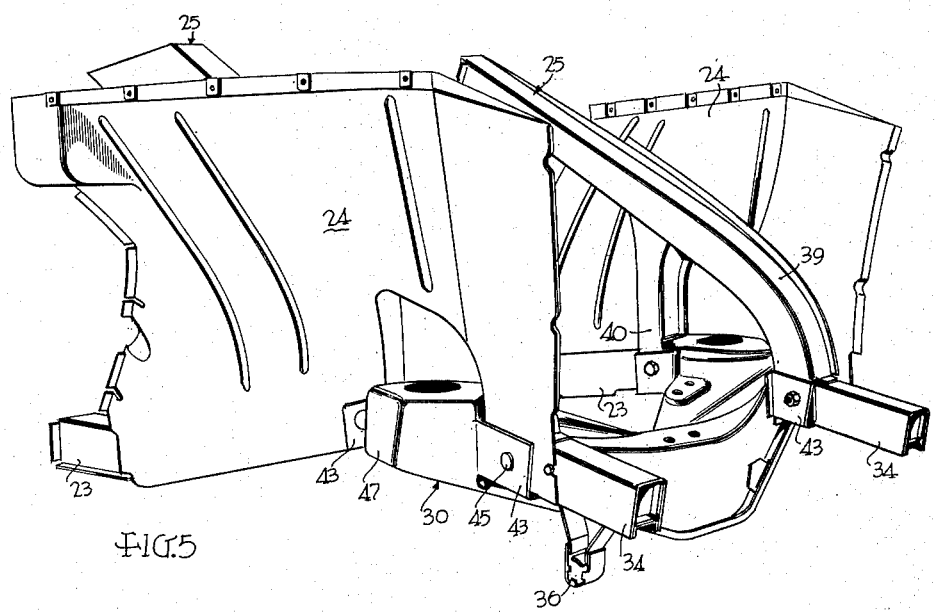
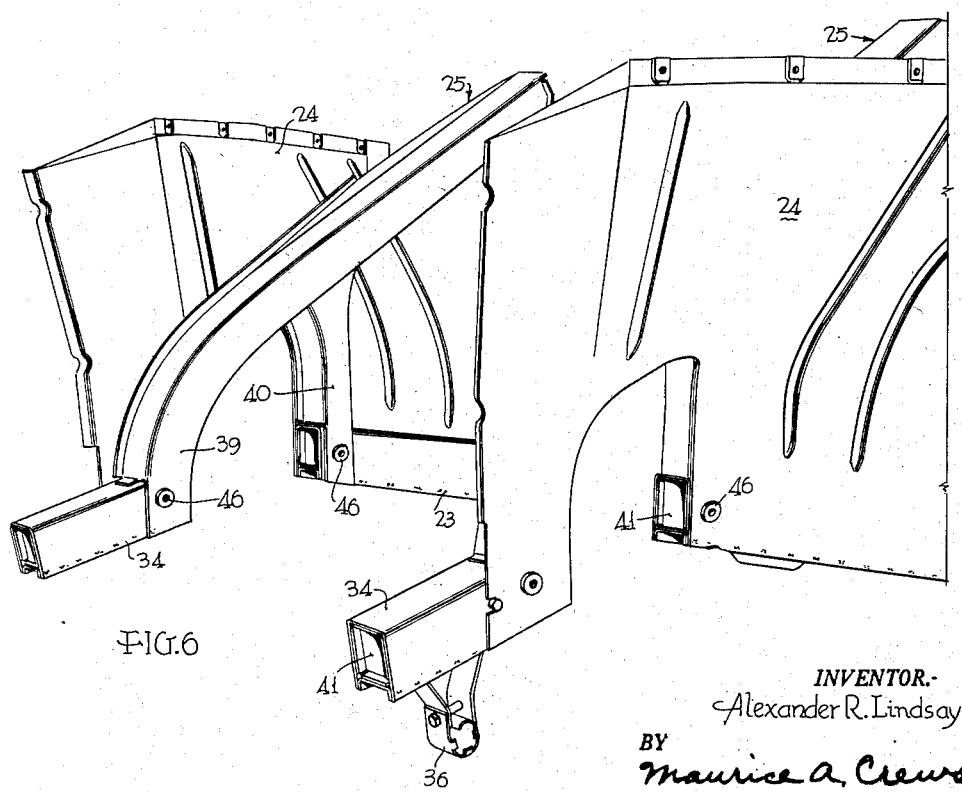
INVENTOR.
Alexander R. Lindsay
BY Maurice A. Crews
ATTORNEY Patented Apr. 28, 1953

UNITED STATES PATENT OFFICE 2,636,774

CROSSBEAM ATTACHMENT FOR AUTOMOBILES

Alexander R. Lindsay, Detroit, Mich., assignor to The Budd Company, Philadelphia, Pa., a corporation of Pennsylvania Application December 16, 1949, Serial No. 133,353

13 Claims. (Cl. 296—28)

The invention relates to a novel construction of the framework of an automobile and to the arrangement and connection of a cross or transverse beam. More specifically, the invention relates to a combined body and chassis structure connected with a transverse beam carrying a pair of road wheels.

The aim of the invention is to overcome certain difficulties which stem from the necessity of having the lower margins of the body or frame crossed by the transverse beam, from the low arrangement of the body underside in modern cars, and from the desirability of easy and convenient removal or insertion of the cross-beam as a unit with wheels, springs, etc. attached thereto.

The aims of the invention are achieved by a construction in which the body has a transversely extending downwardly open recess at the location of the transverse beam, and in which the lower edges of the recess are constructed for connection with such beam. More specifically, the invention contemplates a unit body-chassis construction having a gap between forward and rearward portions of its side sills and having the ends of the sill portions, which adjoin the gap interconnected by the transverse beam or by extensions thereof.

Still more specifically, the invention contemplates in a construction of the indicated type and having lateral inclined braces extending upwardly toward the transverse center plane of the body, the bifurcation of the lower portions of said braces for the reception of and connection with the transverse beam.

A complete and clearer understanding of the above briefly outlined and of other objects, advantages and features of the invention will be gained from the following detailed description and from the illustration of one embodiment in the attached drawing.

In the drawing:

Figure 1 is a fragmentary inside elevation and a longitudinal vertical section along line 1—1 of Figure 2, of the front end portion of a combined body and chassis structure;

Figure 2 is a plan view of one side of the structure shown in Figure 1;

Figure 3 is a sectional plan view corresponding to Figure 2, the section being taken approximately along line 3—3 of Figure 1;

Figure 4 is a perspective view of the transverse or cross-beam for carrying the steering wheels and the front of the motor;

Figure 5 is a three-quarter front perspective of the forward body extensions and of the transverse beam, certain parts of the finished construction being omitted;

Figure 6 is a perspective view similar to Figure 5, but seen from the other side of the body and without the transverse beam; and Figure 7 is a fragmentary transverse section along line 7—7 of Figure 1.

The drawing illustrates the lower front end portion of a combined body and chassis structure, sometimes called a frameless body. Many of the illustrated parts are similar and the non-illustrated parts may be similar to the structures disclosed in Patent No. 2,380,031 for "Vehicle Structure, Especially Vehicle Front End Structure," issued on July 10, 1945, jointly to E. J. Deisley, Theodore Ulrich and applicant, and in applicant's co-pending applications Serial No. 29,457, "Rear End Construction of Self-Supporting Automobile Bodies," and Serial No. 29,458, "Self-Supporting Bodies for Automobiles," both filed on May 27, 1948. The present application repeats the disclosure of said earlier patent and applications only to the extent necessary for full understanding of the invention.

The structure comprises an underbody having side sills or thresholds 15, a floor panel 16 and transverse braces 17 and 18. Secured to the sill members 15 are front door posts 19. The floor panel 16 is forwardly extended by toe-board 20 and dash-board or panel 21. Cowl sides 22 are connected to the side sills 15, posts 19, toe-board 20 and dash-board 21. The cowl top and the upper ends of the front posts 19 are not shown.

To the forward end of this body proper, that is the body portion receiving the occupants of the automobile, is secured a forward extension comprising a pair of sill members 23, panels 24 forming the sides of the motor compartment and the inner walls or skirts of the wheel housings, and forwardly and downwardly inclined braces 25. The rear ends of the sill structures 23 are secured from beneath to the forward portion of floor 16 and to cross-member 18. The braces 25 are secured throughout their rear and outer margins to the panels 21, 24. A brace 26 for the rear support of the motor (not shown) is removably secured to sill members 23. Members 27 and 28 brace posts 19 against dash-board 21, and instrument panel 29 interconnects the posts 19 on opposite sides of the body.

The construction briefly described so far is generally the same as disclosed in application Serial No. 29,458 referred to hereinbefore.

A transverse or axle beam 30 secured and arranged in a manner to be described later on carries on its ends in any known or convenient manner the steering wheels 31, for instance as illustrated by swinging arms 32 (Figure 2) and by coil springs (not shown). This beam may, except for certain details to be described later on, be likewise of known design. It presents a closed box-section with upright front and rear walls 33. The mid-portion of beam 30 carries the front of the motor (not shown).

The differences between the prior constructions and the new construction, which represent the invention, will now be described.

The side sill members 23 terminate in rear of beam 30 but each is aligned with and continued in front of the beam by a sill extension member 34. The sill members 23 and 34 together are on each side of the body a sill structure which is interrupted or cut out at the location of beam 30. The sill extensions 34 are secured to the lower margins of the panels 24.

Front bumper 35, brackets 36 for the equalizer bar (not shown), lower baffle plate 37 and the bottom margins of lateral baffle plates 38 are attached to the extension members in the same or a similar manner as known for their attachment to the front ends of ordinary through-running sills.

The inclined braces 25 have their forward portions 39 downwardly curved and their front ends meet and are secured to the rear ends of the sill extension members 34.

Inserted between the front end of the sill member 23, that is in rear of beam 30, and a mid-region of brace 25, is on each side a second shorter, generally upright brace 40. This brace is a hat-section facing with its open side the respective panel 24 to which it is secured by its flanges. The panels 24 are cut out or recessed in the region between the sill members 23 and their extensions 34 and surrounded by brace portions 39 and braces 40. This recess extends from the lower margin of the panel 24 part-way toward the upper margin thereof and registers with what might be called a recess in the framework formed by the brace members 39 and 40.

The structure in the recess region may be described in different ways. The sill members 23 and 34 together with brace portion 39 and second brace 40 may for instance be considered as a side sill structure which has an abrupt upward offset formed by the brace portions 39 and 40. Looking at the construction in another way, it might for instance also be described as having a brace 25 bifurcated at its forward lower end into two arms 39 and 40. Still further, the structure may be considered broadly as a reinforced side wall provided with a recess emanating from its lower margin.

The main sill members 23 and the sill extensions 34 consist of downwardly facing deep and shallow channel sections connected with each other into closed box-sections. The forward end of each member 23 and both ends of each member 34 are closed and reinforced by inserts 41. At the junctures of the braces 25, 40 and the sill members 34, 23 respectively, the side walls of the sill members are reinforced by the overlapping attachment of said braces.

Short metal tubes or sleeves 42 extend through openings in the side walls of the sill members and are secured to them. The center lines of these tubes coincide about with the centers of the intersections of the sill members and braces and extend transversely to the longitudinal vertical middle plane of the automobile.

The opposite ends of the sill members 23, 34 are telescopingly received in upwardly facing channel section brackets or extensions 43 projecting front and aft beyond beam 30 and secured thereto. The side walls of brackets 43 have holes 44 coaxially aligned with the sleeves 42. Bolts 45 extend in final assembly through the holes 44 and through rubber bushings 46 inserted in the sleeves 42. The bolts are held in the holes 44 against movement relative to the brackets 43 but the bolts may move relative to the sleeves 42 to the extent permitted by the resiliency of the bushings 46.

The construction of the forward end of the automobile is strong enough so that ordinary stresses as they occur in the normal use of an automobile will be transmitted through the braces 25, 40 and the panels 24 across the gaps or recesses for the axle beam without requiring participation of the latter. Stresses of abnormal magnitude, such as in the case of a collision, will however in part be transmitted directly across the gap from sill members 34 to sill members 23 by means of beam 30, its brackets 43 and its connection to the sill members. The axle beam 30 presents an effective bridge between the sill members 23, 34 and helps even in normal use to keep the sill members in alignment and to avoid stress concentrations in the forward structure of the body.

Beam 30 is for its function as stress-transmitting element reinforced by the formation of the forward and rearward brackets 43 as one integral piece, the mid-portion 47 of which is secured to the respective end of beam 30. The bottom and inner walls of the brackets 43 are firmly secured by their flanges 48 to the vertical walls 33 of beam 30.

The new formation of the members extending beyond the dash-board does not interfere with the final assembly of the chassis-body unit from sub-assembly units, one sub-unit forming the body proper and one or several sub-units forming, as for instance shown in Figures 5 and 6, the forward extensions comprising the sill members, braces and wheel housing walls. Such unit construction is disclosed in the hereinbefore cited application Serial No. 29,458.

The connection between the sill extensions 34 and the remainder of the structure is strengthened by the above-described connection with the baffle plates 37 and 38 and furthermore by a plate 49. Plate 49 has its inner margin secured to the inner margins of baffle plate 38 and its outer margin secured to panel 24 so that the three panels together form a closed box-sectional structure of triangular shape in horizontal section. The inner overlapping margins 50 of plates 38 and 49 serve for the support of the radiator, which is not shown.

The new construction affords low arrangement of the body sills and permits intersecting the body sills by the outer ends of beam 30, where it has great height on account of the spring housings. The transmission of vibrations from axle beam to the body is blocked by the rubber bushings, but nonetheless the axle beam forms part of the stress-transmitting structure of the forward body extension. The front axle beam 30 together with the front wheels and their suspension, the motor and rear brace 26 may be easily installed or removed as a unit without interfering with other parts of the body simply by lowering or raising the body relative to beam 30, and by inserting or removing the bolts 45 and the means (not shown) connecting brace 26 and sill members 23.

The invention is not restricted to the illustrated and described embodiment. It is susceptible to modifications and has, of course, to be adapted in each case to the specific style and design of the car to which it is to be applied. Brace 25 may, for instance, be formed as one piece with sill extension 34 or with brace 40, or with both. Another example for a modification is the formation of brace 40 as one piece with sill member 23. There are, however, many other possibilities of changes which will occur to those skilled in the art when, for instance, called upon to apply the invention to a specific general design or to take into account available production facilities.

The terms longitudinal and transverse are in the following claims, to be understood as referring to the longitudinal direction of the automobile or transversely thereof, respectively.

What is claimed is:

1. In an automobile, a longitudinal side sill structure terminating at a distance from one end of the automobile, an extension of the side sill structure aligned with but longitudinally spaced from the latter in the direction toward said end of the automobile, a side wall structure structurally and permanently secured along its lower margin to said side sill structure and its extension, a recess in said side wall structure at the longitudinal location of the space between said side sill structure and its extension, said recess extending from the lower margin of the side wall structure part way toward the upper margin thereof, the opposite ends of said side sill structure and its extension having a transverse wheel supporting beam located between and removably connected with them, said beam projecting with play into said recess.

2. In an automobile, a pair of longitudinal side sill main members extending from a transverse line spaced from one end of the automobile toward the other end thereof, sill extension members aligned with but longitudinally spaced from said main members in the direction toward said first-named end of the automobile, side wall members structurally and permanently secured along their lower margins with said side sill main and extension members, a recess in each side wall member between the respective side sill main and extension members, said recesses extending from the lower margins of the side wall members part way toward the upper margins thereof, the opposite ends of said side sill main and extension members having a transverse wheel supporting beam removably attached to them, said beam projecting into said recesses leaving a small space to the latter's margins, said beam bridging the spaces between said side sill main and extension members and being secured to them.

3. In an automobile, a pair of longitudinal side sill main members extending from a transverse line near one end of the automobile toward the other end thereof, sill extension members aligned with but longitudinally spaced from said main members in the direction toward said first-named end of the automobile, means structurally interconnecting said main and extension members and providing for a downwardly open recess between the respective side sill main and extension members, a transverse wheel supporting beam projecting into said recesses, and resilient connecting means between said beam and said side sill main and extension members.

4. In an automobile, a pair of longitudinal side sill main members extending from a transverse line near one end of the automobile toward the other end thereof, sill extension members aligned with but longitudinally spaced from said main members in the direction toward said first-named end of the automobile, means structurally interconnecting said main and extension members and providing for a downwardly open recess between the respective side sill main and extension members, a transverse wheel supporting beam projecting into said recesses, and transverse horizontal bolts connecting said beam with said main members and said extension members so that the beam bridges and closes said recesses.

5. In an automobile, a pair of longitudinal side sill main members extending from a transverse line near one end of the automobile toward the other end thereof, sill extension members aligned with but longitudinally spaced from said main members in the direction toward said first-named end of the automobile, means structurally interconnecting said main and extension members and providing for a downwardly open recess between the respective side sill main and extension members, a transverse wheel supporting beam projecting into said recesses, said beam being provided with longitudinally extending brackets telescopingly fitting over and secured to the adjoining ends of said main members and extension members.

6. In an automobile, a pair of transversely spaced, longitudinally extending side sill structures, a sharp upward offset in each sill structure, said offset having an open lower side, a transverse beam projecting with play into said offsets and connected with the sill structures fore and aft the offset, said beam forming a rigid structure and bridging the open side of the said offset.

7. In a combined automobile body and chassis construction: a body end wall, side wall extensions structurally connected with and projecting beyond said end wall, side sill structures projecting likewise beyond said end wall and structurally secured to the lower margins of said side wall extensions; a pair of braces, one on each side, extending from said end wall downwardly and away from said end wall; said braces being structurally secured to said end wall, said side wall extensions and to said side sill structures; a downwardly open recess being formed by an interruption in each of said side sill structures at the connection with the respective brace on the side toward said end wall and by a cut-out in the respective side wall extension; a second brace secured to each of said first-named braces, side wall extensions and said side structures; said second braces being arranged on the sides of said recesses nearer to said end wall; said braces and side sill structures being provided adjoining said recesses with means for the attachment of members bridging and closing said recesses.

8. In an automobile, a pair of transversely spaced braces extending in longitudinal direction downwardly and toward one end of the automobile and forming part of the supporting structure thereof, the lower ends of said braces being bifurcated into two arms providing for downwardly open recesses; a wheel supporting transverse beam in said recesses, and means connecting said beam with the two arms of each brace to bridge said recesses.

9. Automobile structure, especially of the combined chassis and body type, said structure forming by its permanently connected parts a downwardly and laterally open transverse recess extending through the lateral sides thereof, a transversely extending supporting beam projecting into said recess, and generally transverse horizontal bolts extending near both lateral sides of said structure through the corners of said recess and adjoining parts of said beam so that the latter as a rigid structure bridges said recess.

10. Automobile structure, especially of the combined chassis and body type, said structure forming by its permanently connected parts a downwardly and laterally open transverse recess extending through the lateral sides thereof, a transversely extending supporting beam projecting into said recess, said beam being provided with longitudinally projecting rigid brackets, said brackets and at least some of the corners of said recess overlapping each other, and removable connecting means engaging said brackets and corners in their regions of overlap.

11. Automobile structure, especially of the combined chassis and body type, said structure forming by its permanently connected parts a downwardly and laterally open transverse recess extending through the lateral sides thereof, a transversely extending supporting beam projecting into said recess, said beam being provided with longitudinally projecting brackets forming with the beam a rigid structure, said brackets and at least some of the corners of said recess telescopingly overlapping each other, and removable connecting means engaging said brackets and corners in their regions of overlap.

12. A transverse beam for automobile structures, especially a beam for the attachment of accessories such as road wheels and power unit, said beam being provided as permanent, rigid parts thereof with transversely spaced, longitudinally extending brackets on each side of each end, said brackets being formed and adapted for telescopingly fitting over and securing to adjoining longitudinally spaced ends of frame members of the automobile structure.

13. A transverse beam for automobile structures, especially a beam for the attachment of accessories such as road wheels and power unit, said beam being provided as permanent, rigid parts thereof with transversely spaced, longitudinally extending and upwardly facing U-section brackets on each side, said brackets being formed and adapted for telescopingly fitting from underneath over and being secured to adjoining longitudinally spaced ends of frame members of the automobile structure.

ALEXANDER R. LINDSAY.

References Cited in the file of this patent

UNITED STATES PATENTS

| Number | Name | Date |
| --- | --- | --- |
| 1,833,401 | Moorhouse | Nov. 24, 1931 |
| 2,048,953 | Sherman | July 28, 1936 |
| 2,074,158 | Avery | Mar. 16, 1937 |
| 2,254,282 | Griswold | Sept. 2, 1941 |
| 2,289,395 | Ulrich | July 14, 1942 |
| 2,362,077 | Ledwinka et al. | Nov. 7, 1944 |

FOREIGN PATENTS

| Number | Country | Date |
| --- | --- | --- |
| 856,717 | France | Mar. 23, 1940 |